(12) United States Patent
Strauss

(10) Patent No.: US 9,604,652 B2
(45) Date of Patent: Mar. 28, 2017

(54) METHOD FOR A DRIVER ASSISTANCE SYSTEM FOR AUTONOMOUS LONGITUDINAL AND/OR LATERAL CONTROL OF A VEHICLE

(71) Applicant: Continental Teves AG & Co. oHG, Frankfurt (DE)

(72) Inventor: Matthias Strauss, Pfungstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 52 days.

(21) Appl. No.: 14/370,833

(22) PCT Filed: Jan. 18, 2013

(86) PCT No.: PCT/DE2013/100015
§ 371 (c)(1),
(2) Date: Jul. 7, 2014

(87) PCT Pub. No.: WO2013/127387
PCT Pub. Date: Sep. 6, 2013

(65) Prior Publication Data
US 2015/0006028 A1    Jan. 1, 2015

(30) Foreign Application Priority Data
Mar. 1, 2012 (DE) ........................ 10 2012 101 686

(51) Int. Cl.
| | | |
|---|---|---|
| *B60W 30/12* | (2006.01) | |
| *B60W 50/08* | (2012.01) | |
| *B60W 50/10* | (2012.01) | |
| *B60W 50/14* | (2012.01) | |
| *B60K 35/00* | (2006.01) | |
| *B60K 37/06* | (2006.01) | |
| *B62D 15/02* | (2006.01) | |
| *B62D 1/28* | (2006.01) | |
| *B60W 30/16* | (2012.01) | |
| *B60W 30/09* | (2012.01) | |
| *B60W 30/10* | (2006.01) | |
| *B60W 30/14* | (2006.01) | |
| *B60W 50/00* | (2006.01) | |

(52) U.S. Cl.
CPC ........... *B60W 50/082* (2013.01); *B60K 35/00* (2013.01); *B60K 37/06* (2013.01); *B60W 30/09* (2013.01); *B60W 30/12* (2013.01); *B60W 30/16* (2013.01); *B60W 50/10* (2013.01); *B60W 50/14* (2013.01); *B62D 1/28* (2013.01); *B62D 15/025* (2013.01); *B62D 15/026* (2013.01); *B60K 2310/246* (2013.01); *B60K 2310/248* (2013.01); *B60K 2310/266* (2013.01); *B60K 2310/268* (2013.01); *B60W 30/10* (2013.01); *B60W 30/14* (2013.01); *B60W 2050/0074* (2013.01); *B60W 2050/0096* (2013.01); *B60W 2540/04* (2013.01); *B60W 2540/10* (2013.01); *B60W 2540/18* (2013.01)

(58) Field of Classification Search
CPC ...... B60W 30/10; B60W 30/12; B60W 30/14; B60W 2050/007; B60W 2050/0071; B60W 2050/0072; B60W 2050/0073; B60W 2050/0074
See application file for complete search history.

(56) References Cited

U.S. PATENT DOCUMENTS

| | | | |
|---|---|---|---|
| 5,245,422 A | 9/1993 | Borcherts et al. | |
| 6,116,369 A | 9/2000 | King et al. | |
| 8,606,455 B2 | 12/2013 | Boehringer et al. | |
| 2003/0163239 A1* | 8/2003 | Winner et al. | 701/93 |
| 2006/0009910 A1* | 1/2006 | Ewerhart et al. | 701/301 |
| 2008/0190681 A1 | 8/2008 | Mayser et al. | |
| 2012/0277947 A1* | 11/2012 | Boehringer et al. | 701/23 |
| 2013/0110369 A1 | 5/2013 | Breu | |
| 2016/0200317 A1* | 7/2016 | Danzl | B60K 28/06 701/25 |
| 2016/0303972 A1* | 10/2016 | Kuhne | B60W 30/12 |

FOREIGN PATENT DOCUMENTS

| | | |
|---|---|---|
| DE | 42 21 015 | 1/1993 |
| DE | 102005036923 | 2/2007 |
| DE | 102006058412 | 6/2008 |
| DE | 102009008142 | 8/2010 |
| DE | 102009048954 | 4/2011 |
| DE | 102009050404 | 5/2011 |
| DE | 102011101541 | 11/2012 |
| EP | 2 517 936 | 10/2012 |
| WO | WO 2012/042354 | 4/2012 |

OTHER PUBLICATIONS

Larsson, Annika FL. "Driver usage and understanding of adaptive cruise control." Applied ergonomics 43.3 (2012): 501-506.*

(Continued)

*Primary Examiner* — Dale Moyer
(74) *Attorney, Agent, or Firm* — W. F. Fasse

(57) ABSTRACT

A driver assistance system and an operating method thereof are configured and adapted to perform autonomous longitudinal and/or lateral control of a vehicle. At least one control task for longitudinal and/or lateral control of the vehicle can be transferred from the driver to the driver assistance system. This involves informing the driver that a control task can be transferred to the system, and then transferring the control task from the driver to the system in response to the driver ceasing a manual control of this control task.

16 Claims, No Drawings

(56) References Cited

OTHER PUBLICATIONS

International Search Report of the International Searching Authority for International Application PCT/DE2013/100015, mailed Jun. 14, 2013, 4 pages, European Patent Office, HV Rijswijk, Netherlands.
PCT International Preliminary Report on Patentability including English Translation of PCT Written Opinion of the International Searching Authority for International Application PCT/DE2013/100015, issued Sep. 12, 2014, 11 pages, International Bureau of WIPO, Geneva, Switzerland.
German Search Report for German Application No. 10 2012 101 686.0, dated Nov. 8, 2012, 6 pages, Muenchen, Germany, with English translation, 5 pages.

* cited by examiner

METHOD FOR A DRIVER ASSISTANCE SYSTEM FOR AUTONOMOUS LONGITUDINAL AND/OR LATERAL CONTROL OF A VEHICLE

FIELD OF THE INVENTION

The invention relates to a method for operating a driver assistance system designed for autonomous longitudinal and/or lateral control of a vehicle, wherein at least one control task for longitudinal and/or lateral control of the vehicle can be transferred from vehicle operator to the driver assistance system. The invention further relates to a driver assistance system designed to implement the method of the invention.

BACKGROUND INFORMATION

Driver assistance systems for autonomous longitudinal and/or lateral control of a vehicle, i.e. designed to assume one or more longitudinal and/or lateral control tasks of the vehicle, are known from the art in different realizations. Such systems usually have in common that the vehicle operator can transfer one or more control tasks for longitudinal and/or lateral control to the corresponding driver assistance system if required.

The control tasks concerning longitudinal control of the vehicle include, for example, controlling the longitudinal acceleration and longitudinal speed of the vehicle or the vehicle speed in general and maintaining a specific distance from a preceding vehicle. These control tasks can be performed either manually by the vehicle operator, in particular through manual control or actuation of the brake (brake pedal) and the accelerator (accelerator pedal), or autonomously by a driver assistance system which is connected to the corresponding control devices in the vehicle.

The control tasks concerning the lateral control of the vehicle include, for example, controlling the lateral acceleration and lateral speed or the vehicle steering in general and keeping (lane keeping) or changing a lane (lane change), turning, driving through a curve and/or overtaking another road user. These control tasks can also be performed either manually by the vehicle operator, in particular through manual control or actuation of the vehicle steering (vehicle steering wheel), or autonomously by a driver assistance system which is connected to the corresponding control devices in the vehicle.

Driver assistance systems are also already known which combine the control tasks concerning both longitudinal and lateral control of a vehicle in one system and thus enable an entirely autonomous control of a vehicle (autonomous vehicle guidance) by the driver assistance system.

U.S. Pat. No. 6,116,369 A shows an adaptive travel control system for a vehicle, in particular an ACC system (Adaptive Cruise Control System) which is capable of operating in at least two modes, a first cruise mode, in which the speed of the vehicle is controlled to maintain a set speed, and a second follow mode, in which the speed of the vehicle is controlled to maintain a set distance from the preceding target vehicle, wherein the system includes means to switch from cruise mode to follow mode if a target vehicle is detected within a predefined distance of the vehicle, and a driver display interface for displaying the mode of operation of the adaptive cruise control system.

DE 10 2006 058 412 A1 shows a lane keeping system in which a current lane being driven on by the vehicle is detected by means of a lane detection system, a leading vehicle preceding the vehicle and its track of movements is detected as an object track by means of an object detection system, and support in keeping the lane is realized by means of a control device, wherein the control device can be operated in a purely lane-related type of support in which the support is given, based on the detected current lane, in a purely object-related type of support, in which the support is given, based on the determined object track, and in a merged type of support corresponding to a combination of the lane-related and object-related types of support, wherein it is determined as a function of the driving speed of the vehicle which type of assistance to chose as support.

A substantial disadvantage of the known driver assistance systems for autonomous longitudinal and/or lateral control of a vehicle is that the vehicle operator is faced with an increasingly high operational effort or increasingly complex operational tasks due to the number and variety of systems used in modern vehicles, including also other systems such as navigation systems, multimedia systems or comfort systems. The known systems usually make use of operating elements such as buttons, levers or other switchgear.

SUMMARY OF THE INVENTION

In view of the above, it is therefore an object of at least one embodiment of the invention to provide a simplified operating concept for driver assistance systems for autonomous longitudinal and/or lateral control of a vehicle. In particular a solution shall be provided by which the driver's operating effort can be reduced and operation of driver assistance systems can be made more intuitive.

The above object can be achieved by a method with features according to an embodiment of the invention, and by a driver assistance system with features according to another embodiment of the invention. Advantageous realizations and further developments of the invention are the subject matter of further embodiments, wherein combinations and further developments of individual features with each other are also within the scope of the invention.

An underlying idea of at least one embodiment of the invention is to design the activation and deactivation of a driver assistance system for longitudinal and/or lateral control of a vehicle such that it can be performed intuitively and in particular without additional operating elements. Within the context of at least one embodiment of the invention, operating elements already existing in the vehicle, such as pedals and the steering wheel, can be used to transfer control tasks to the driver assistance systems. It is particularly provided that it is displayed to the vehicle operator when a control task can be assumed by a driver assistance system, whereupon the vehicle operator can transfer the control task to the driver assistance system by simply no longer actuating the corresponding manual operating elements, i.e. by simply ceasing to manually actuate the pedals or steering wheel for example.

Significant advantages of at least one embodiment of the invention and the proposed operating concept are that, due to providing information to the vehicle operator or driver, in particular as to which control tasks can be transferred to the driver assistance system at what point, in combination with the simplified transfer of the respective control task, the activation and deactivation of the driver assistance systems is considerably simpler and more intuitive. The complexity and effort involved in operating a driver assistance system are significantly reduced. In addition, the acceptance of such driver assistance systems by vehicle operators can be increased, since the quality of the systems can be readily seen, in particular if a display is provided as to when or how often and how long a control task can be transferred to the corresponding system.

Also, the driving comfort as perceived by the vehicle operator and the feeling of safety can be increased significantly, since, for example, a so-called mode confusion, which arises when a vehicle operator takes his hands off the wheel without having activated an autonomous lateral control, cannot occur any longer, since the autonomous lateral control according to the invention is activated preferably directly or the vehicle operator is informed directly of the fact that the control task cannot be transferred at the moment. The perceived driving comfort and acceptance can be increased further, since a vehicle operator is given back control of the vehicle preferably immediately as soon as he assumes the corresponding manual control again.

The method according to an embodiment of the invention serves to operate a driver assistance system designed for autonomous longitudinal and/or lateral control, wherein at least one control task for longitudinal and/or lateral control of the vehicle can be transferred from the vehicle operator to the driver assistance system. According to this embodiment of the invention, the vehicle operator is informed whether the at least one control task can be transferred to the driver assistance system, i.e. whether or not one or more control tasks can be transferred to the driver assistance system. Informing the vehicle operator can be done in particular such that the information reveals which control task or which control tasks are concerned. The information can be further such that an acoustic, visual and/or haptic indication is output to the vehicle operator if one or more control tasks can be transferred to the driver assistance system and, on the other hand, no indication is output if the one or more control tasks cannot be transferred to the driver assistance system.

According to this embodiment of the method of the invention, the transfer of the at least one control task occurs if the vehicle operator interrupts a corresponding manual control of the vehicle. The transfer is thus particularly such that, for example, a control task for longitudinal control of the vehicle is transferred to the driver assistance system if the vehicle operator interrupts the corresponding manual longitudinal control such as actuation of the accelerator pedal. The transfer of a control task for lateral control according to the invention occurs preferably if the vehicle operator interrupts the corresponding manual lateral control, for example if the vehicle operator takes his hands off the steering wheel. To interrupt means, in particular, ceasing or ending an actuation or operation of an operational element designed for manual longitudinal and/or lateral control.

In particular, only an additional operational element (switch, button, etc.) may be provided in the vehicle to put into operation the driver assistance system wherein the method of the invention is used, e.g. an operational element for switching off/on or for switching into a stand-by mode.

DETAILED DESCRIPTION OF EXAMPLE EMBODIMENTS OF THE INVENTION

According to a preferred realization of the method according to the invention the vehicle operator is informed whether or when he has to assume the at least one control task again, in particular if this has been preceded by a transfer of the at least one control task to the driver assistance system. According to the invention the assumption of the at least one control task by the vehicle operator, i.e. a transfer of the control task from the driver assistance system to the vehicle operator, occurs when the vehicle operator reassumes the corresponding manual control of the vehicle, i.e. in particular when he operates once again the operational element designed for manually performing the respective control task. The operational elements can thus also be, for example, the steering wheel and/or the pedals (brake, accelerator) of the vehicle.

According to a further preferred realization of the method according to the invention the vehicle operator is informed, by means of outputting at least one indication, whether the at least one control task can be transferred to the driver assistance system or whether the vehicle operator has to reassume the at least one control task. Outputting the indication can be done, for example, by means of visual display elements within the field of view of the vehicle operator, by means of acoustic signals and/or by means of haptically perceivable signaling devices. The at least one indication is preferably the output of at least one of the following information:

Control task can be transferred to the driver assistance system.

Control task cannot be transferred to the driver assistance system.

Control task has to be (re)assumed by the vehicle operator.

According to the invention, separate indications or separate output devices can be provided for all control tasks which can be transferred to the driver assistance system, in particular such that the diver recognizes which of the control tasks can and cannot be transferred at the moment and which of the control tasks have to be reassumed by him.

In an advantageous embodiment of the method according to the invention it is determined as a function of one or more conditions whether the at least one control task can be transferred to the driver assistance system or whether the vehicle operator has to reassume the control task.

In determining this it is preferably taken into account whether the corresponding control task or the corresponding control tasks can be assumed safely or without risk by the driver assistance system (autonomously). The one or more conditions is or are preferably at least one of the following conditions:

One or more sensors for driving environment sensing are ready for operation

Reliable driving environment sensing by means of one or more sensors is possible (for example when reaching a sufficiently low speed)

Reliable lane detection

Reliable sensing of an object to be followed

Driving on a certain type of road

Exceeding a certain speed

Falling below a certain speed

Exceeding a certain distance from a preceding vehicle

Not maintaining a certain minimum distance from a preceding vehicle

Vehicle operator is alert (in particular: vehicle operator focuses on traffic situation)

As a condition for transferring a control task for longitudinal and/or lateral control of the vehicle, it can be provided, for example, that the driving environment sensing by means of driving environment sensors be done reliably, e.g. with a certain sensing radius, that the lane currently used be reliably detected, i.e. that the left and right lane boundaries be reliably captured, that a preceding object has been detected and captured as an object to be followed, that a certain type of road be used, e.g. a country road or freeway, that a certain speed currently be not exceeded or a certain minimum distance from a preceding vehicle be maintained.

Furthermore it can be defined as a condition whether the vehicle is driven in urban traffic or overland, since, for example, in urban traffic the traffic situation is often too complex to perform an autonomous longitudinal and/or lateral control of the vehicle.

Determining whether the at least one control task can be transferred to the driver assistance system or whether the vehicle operator has to reassume the control task, and in particular determining the one or more conditions can be done in particular by means of one or more sensor devices. Driver assistance systems to which the method according to the invention can be applied usually have corresponding sensor devices anyway, which can thus be used for this purpose. Such sensors can be, for example, radar sensors, optical cameras, ultrasonic sensors, lidar sensors or infrared sensors, which are arranged at the vehicle and connected to the driver assistance systems.

According to an advantageous realization of the method according to the invention the driver assistance system transfers the vehicle into a safe state if it is determined, in particular as a function of at least one of the above conditions, that the at least one control task cannot be transferred to the driver assistance system and, if the vehicle operator interrupts the corresponding manual control of the vehicle, in particular despite the information that the control task cannot be transferred.

In addition or as an alternative the driver assistance system can transfer the vehicle into a safe state, in particular after a prior transfer of the at least one control task to the driver assistance system, if it is determined that the at least one control task has to be reassumed by the vehicle operator and if the vehicle operator does not reassume the corresponding manual control of the vehicle.

A period or time window may be defined for this purpose within which the vehicle operator has to reassume the control task before the vehicle is transferred to a safe state by the driver assistance system.

Safe state may mean, for example, rolling to a stop or braking the vehicle, autonomously guiding the vehicle to the edge of the roadway or to a shoulder and/or parking the vehicle on the side of the road.

According to a particular embodiment of the method according to the invention the vehicle operator is informed of at least one reason why the at least one control task cannot be transferred or has to be reassumed. The at least one reason is in particular the one or more conditions by means of which it has been determined whether the at least one control task can be transferred to the driver assistance system or has to be reassumed by the vehicle operator. The information regarding the reason can be realized, for example, by means of a visual display device.

The reason why the at least one control task cannot be transferred is displayed in particular if it is determined that the control task cannot be transferred and the vehicle operator tries to transfer the control task to the driver assistance system by interrupting the corresponding manual control.

According to an advantageous further development of the method according to the invention it is recommended to the vehicle operator to perform a lane change if a transfer of at least one control task, in particular a control task for lateral control of the vehicle, has occurred previously and if the driver assistance system further detects that a lane change is sensible. A lane change can be sensible, for example, if a preceding vehicle driving in the same lane drives slower than the vehicle or if it is detected that the right lane is free, e.g. after a passing maneuver. A lane change can be recommended to the vehicle operator in particular by means of a corresponding indicating or signaling device, whereupon the vehicle operator can agree to an autonomous lane change carried out by the driver assistance system, for example by activating the vehicle turn signal.

According to another advantageous realization of the method according to the invention it is determined, as a function of one or more conditions, in particular as a function of one of the above-mentioned conditions, whether the vehicle operator may divert his attention away from the traffic situation and/or has to direct his attention to the traffic situation. Furthermore a corresponding indication is preferably output to the vehicle operator, i.e. an indication that the vehicle operator may divert his attention away from or has to direct his attention to the traffic situation.

The driver assistance system preferably operates the vehicle in or transfers it to a fully automatic or fully autonomous driving mode, in particular including all required longitudinal and lateral control tasks if it is determined that the vehicle operator may divert his attention away from the traffic situation and if it is detected, for example by means of an interior or passenger camera, that the vehicle operator diverts his attention away from the traffic situation.

The method of the invention can in particular also be used for driver assistance systems with an emergency braking and/or emergency steering function. For emergency braking systems a condition can be, for example, that the vehicle operator not or only slightly (unintentionally) actuate the accelerator pedal. If he does actuate it, the intervention by the emergency braking system is interrupted. With emergency steering systems, a defined track offset can occur which is sufficient to avoid an obstacle in case of an emergency steering intervention with the vehicle operator not having his hands on the wheel. An emergency steering intervention can be further followed by an emergency braking intervention.

The driver assistance system which applies the method of the invention is preferably a system for autonomous distance control, speed control, lane keeping support, lane change support and/or for fully autonomous vehicle guidance. The driver assistance system is preferably designed with suitable sensing devices, i.e. with driving environment sensors and/or sensors for sensing the driving dynamics, in particular for sensing the corresponding driving situation, of objects, lanes, object speed, distances, etc., and for determining the one or more conditions by means of which it is determined whether one or more control tasks for autonomous longitudinal and/or lateral control of the vehicle can be transferred to the driver assistance system. The driver assistance system is further preferably designed with or connected to actuating and/or control devices for implementing or performing the tasks of autonomous longitudinal and/or lateral control of the vehicle.

Driver assistance systems applying the method of the invention are known from the art in many different realizations. Known systems are, for example speed control, parking assistant, brake assistant, ACC (adaptive cruise control) or intelligent cruise control, run-up alarm, blind spot assistant, traffic jam assistant, lane detection system, lane keeping assistant, lane keeping support, lane change assistant, ISA (intelligent speed adaption), AEB (automatic emergency braking), and curve speed assistant.

In particular a driver assistance system already known from the art can be further developed to implement the method according to the invention, preferably such that the driver assistance system comprises means or is connected to means for determining whether at least one control task can be transferred to the driver assistance system, and furthermore comprises means or is connected to means for outputting at least one of the following indications:

Control task can be transferred to the driver assistance system.

Control task cannot be transferred to the driver assistance system.

Control task has to be reassumed by the vehicle operator.

The method of the invention is further preferably designed such that the transfer of the at least one control task occurs if the vehicle operator interrupts a corresponding manual control of the vehicle.

Other advantages and optional realizations of the invention will become apparent from the following exemplary embodiments.

According to an exemplary embodiment the method of the invention can be applied in one or more driver assistance systems of a vehicle, wherein a first driver assistance system can be, for example, a system for autonomous longitudinal control, such as a speed and distance control system, e.g. an ACC (adaptive cruise control) system, and a second driver assistance system can be a system for autonomous lateral control, for example a lane keeping assistance system.

To implement the method of the invention the two driver assistance system are designed such that the vehicle operator is informed by means of acoustic signaling devices and by means of a display device in the area of the dashboard whether and which control tasks can be transferred to the driver assistance systems.

To implement the method of the invention the driver assistance systems are further designed such that the transfer of the respective control task occurs if the vehicle operator interrupts the manual control of the vehicle which corresponds to the respective control task.

An example is a driving situation in which the vehicle operator manually guides the vehicle on a freeway. The vehicle operator accelerates the vehicle up to a certain speed, for example a desired speed. If one or more conditions are fulfilled by means of which the driver assistance system for autonomous longitudinal control determines whether the control task for longitudinal control can be transferred from the vehicle operator to the driver assistance system, this is indicated to the vehicle operator via the output of a specific signal sound. The vehicle operator can then take his foot off the accelerator pedal, which in this case means interrupting the manual longitudinal control of the vehicle, and whereupon the driver assistance system autonomously maintains the speed of the vehicle and thus assumes the control task. If the vehicle operator brakes, the driver assistance system or the autonomous longitudinal control is deactivated. If the vehicle operator takes his foot off the brake again, the vehicle rolls to a stop, and the autonomous longitudinal control is preferably not assumed again until the vehicle operator actuates the accelerator pedal again.

When operating a driver assistance system according to the method of the invention, safety systems such as emergency brake assistant or heading control remain permanently active to ensure consistent driving safety.

The condition by means of which the driver assistance system determines whether or that the control task for longitudinal control can be transferred can be in this case, for example, reaching a specific minimum distance from a preceding vehicle. If in the further course of driving, one or more conditions are fulfilled by means of which the driver assistance system for autonomous lateral control determines whether or that the control task for lateral control can be transferred to the driver assistance system, for example by means of the secure detection of the left and right lane boundaries (e.g. road markings), this is displayed to the vehicle operator via the output or display of a symbol on the dashboard that he may take his hands off the steering wheel. The vehicle operator can then take his hands off the steering wheel, which means interrupting the manual lateral control of the vehicle, and whereupon the driver assistance system assumes the lateral control task, in this case by keeping the current lane by means of autonomous steering interventions.

The display informing the vehicle operator that he can take his hands off the steering wheel and thus transfer the control task for lateral control of the vehicle to the driver assistance system is, for example, the display of an adequate symbol on a display device in the area of the dashboard, such as a green symbol comprising a steering wheel with hands to its sides. The display informing the vehicle operator that he has to put his hands on the steering wheel again and thus reassume the control task for lateral control of the vehicle is, for example, correspondingly a red symbol comprising also a steering wheel with hands gripping the steering wheel.

According to the invention it can be additionally displayed to the vehicle operator why a control task cannot be transferred at the moment or why it has to be reassumed. If, for example a specific speed threshold value has been exceeded, e.g. 80 km/h, and if it is a condition for being able to transfer the lateral control of the vehicle from the vehicle operator to the driver assistance system that this speed threshold value be not exceeded, this can be displayed to the vehicle operator by a corresponding additional symbol, such as a speed limit sign showing a maximum speed of 80 km/h.

If in the present example a slower vehicle appears ahead of the vehicle in the further course of driving, according to a preferred realization of the method of the invention the driver assistance system can be designed such that a change of lanes is recommended to the vehicle operator. In this case the driver assistance system can be designed such that the vehicle operator, e.g. via actuating the vehicle turn signal, can agree to an autonomous lane change, whereupon the driver assistance system changes the lane independently.

As a further exemplary presentation of the method according to the invention a driving situation will now be described in which the vehicle is currently being autonomously longitudinally and laterally controlled by the two driver assistance systems, with the vehicle approaching the end of a traffic jam, i.e. running up to a traffic jam. In this case the driver assistance systems could be designed according to the invention such that the speed of the vehicle is autonomously adjusted downward and the vehicle is guided in the traffic jam independently, by means of autonomous longitudinal and lateral control, by the driver assistance system. If it is determined as a function of one defined condition that the vehicle operator may divert his attention away from the traffic situation, a corresponding indication is output to the vehicle operator according to the invention, whereupon the vehicle operator can divert his attention away from the traffic situation. Said one defined condition can be, for example, a specific lower limiting value for the vehicle speed, at which value the reliability and/or accuracy of the sensing systems of one or more driver assistance systems is ensured such that no errors can occur with a sufficiently high probability.

For the event that the traffic jam disperses the driver assistance systems can further be designed according to the invention such that the vehicle is accelerated to a specific speed, wherein upon reaching a limiting value for the speed the vehicle operator is informed that he has to direct his attention to the traffic situation again. If the vehicle operator then directs his attention to the traffic situation, the autonomous longitudinal and lateral control by the driver assistance systems is continued.

For monitoring whether the vehicle operator directs his attention to the traffic situation or not (i.e. diverts it), an interior camera can be used to monitor the vehicle operator.

In the further course of driving a driving situation can arise, for example, in which the lane marking is omitted and/or is not detected by the sensing system of the driver assistance system any longer, thus in particular possibly not fulfilling a condition any longer for being able to transfer the control task for lateral control of the vehicle to the driver assistance system. By means of outputting an indication the vehicle operator is informed according to the invention that he has to reassume the control task for lateral control of the vehicle again. The driver assistance systems can be designed according to a preferred embodiment of the invention such that the vehicle is slowed down if the vehicle operator does not assume manual control of the vehicle within a first defined time window, and such that the vehicle is guided to a breakdown lane if the vehicle operator still does not assume manual control of the vehicle within a second defined time window.

The invention claimed is:

1. A method of operating a driver assistance system, which is adapted and configured to perform autonomous longitudinal or lateral control of a vehicle,
   wherein at least one control task for longitudinal or lateral control of the vehicle can be transferred from the vehicle operator to the driver assistance system,
   the method comprising:
   while the vehicle operator is performing the control task by operating an operating element of the vehicle, in the driver assistance system automatically determining whether the control task can be transferred from the vehicle operator to the driver assistance system, and informing the vehicle operator when the control task can be transferred from the vehicle operator to the driver assistance system, and
   then automatically transferring the control task from the vehicle operator to autonomous control by the driver assistance system in response to the vehicle operator discontinuing the operating of the operating element by which the vehicle operator had been performing the control task.

2. The method according to claim 1, further comprising, once the transfer of the control task to the driver assistance system has occurred, informing the vehicle operator whether he has to reassume the control task, wherein reassuming the control task occurs in response to the vehicle operator operating the operating element to perform the control task.

3. The method according to claim 2, further comprising transferring the vehicle into a safe state in response to:
   the control task cannot be transferred to the driver assistance system and the vehicle operator discontinues operation of the operating element by which the vehicle operator had been performing the control task, or
   the control task has to be reassumed by the vehicle operator and the vehicle operator does not operate the operating element to perform the control task.

4. The method according to claim 2, further comprising informing the vehicle operator of one or more conditions why the control task cannot be transferred or has to be reassumed.

5. The method according to claim 4, further comprising determining, as a function of the one or more conditions, whether the vehicle operator may divert his attention away from the traffic situation or has to direct his attention to the traffic situation again, and
   outputting a corresponding indication to the vehicle operator that he may divert his attention away from the traffic situation or again has to direct his attention to the traffic situation.

6. The method according to claim 5, characterized in that the driver assistance system operates the vehicle in a fully automatic driving mode if the vehicle operator may divert his attention away from the traffic situation and the vehicle operator diverts his attention away from the traffic situation.

7. The method according to claim 1, wherein the determining of whether the control task can be transferred to the driver, assistance system is performed as a function of at least one of the following conditions:
   one or more sensors for sensing a driving environment are ready for operation,
   reliable driving environment sensing by one or more sensors,
   reliable lane detection,
   reliable sensing of an object to be followed,
   driving on a certain type of road,
   exceeding a certain speed,
   falling below a certain speed,
   exceeding a certain distance from a preceding vehicle,
   not maintaining a certain minimum distance from a preceding vehicle, or
   the vehicle operator is alert.

8. The method according to claim 1, further comprising recommending a lane change to the vehicle operator after at least one control task for lateral control of the vehicle has been transferred to the driver assistance system and the driver assistance system determines that the lane change is appropriate.

9. The method according to claim 1, characterized in that the driver assistance system is a system for autonomous distance control, speed control, lane keeping support, lane change support or fully autonomous vehicle guidance.

10. The method according to claim 1, wherein the operating element is a steering wheel, an accelerator pedal or a brake pedal of the vehicle.

11. The method according to claim 1, excluding operation of an additional operating element by the vehicle operator for the transferring of the control task from the vehicle operator to autonomous control by the driver assistance system.

12. The method according to claim 1, wherein the driver assistance system is in a manual driving mode when the vehicle operator is performing the control task, and the driver assistance system is automatically switched to an autonomous driving mode in connection with the transferring of the control task from the vehicle operator to the autonomous control by the driver assistance system.

13. The method according to claim 1, wherein the automatic transferring of the control task is performed in response to only the vehicle operator's discontinuing the operating of the operating element for the control task without operating any other operating element for activating the driver assistance system.

14. A driver assistance system adapted and configured to perform autonomous longitudinal or lateral control of a vehicle, wherein a control task for longitudinal or lateral control of the vehicle can be transferred from the vehicle operator to the driver assistance system, characterized in that
   the driver assistance system comprises means or is connected to means for automatically determining whether the control task can be transferred from the vehicle operator to the driver assistance system, while the vehicle operator is performing the control task by operating an operating element of the vehicle, and the driver assistance system comprises means or is connected to means for automatically outputting an indication that the control task can be transferred from the vehicle operator to the driver assistance system;

wherein the driver assistance system is adapted and configured such that after the outputting of the indication, the control task is transferred from the vehicle operator to autonomous control by the driver assistance system in response to the vehicle operator discontinuing the operating of the operating element by which the vehicle operator had been performing the control task.

15. The driver assistance system according to claim 14, wherein the operating element is a steering wheel, an accelerator pedal or a brake pedal of the vehicle.

16. A method of operating a driver assistance system of a motor vehicle, regarding a control task for the lateral or longitudinal driving control of the motor vehicle, said method comprising the steps:

a) with sensors of the motor vehicle, producing sensor data;

b) while a driver of the motor vehicle is humanly performing the control task by operating a vehicle control element for the control task, in the driver assistance system evaluating the sensor data to determine whether the sensor data satisfy at least one threshold condition that is required for the driver assistance system to take over and autonomously perform the control task;

c) in response to the step b) having determined that the sensor data satisfy the at least one threshold condition, with a signaling device in the motor vehicle automatically outputting an information which informs the driver that the driver assistance system can take over and autonomously perform the control task;

d) after the step c), detecting whether the driver is continuing or has discontinued the operating of the vehicle control element; and e) in response to the step d) having detected that the driver has discontinued the operating of the vehicle control element, automatically activating the driver assistance system to autonomously perform the control task.

\* \* \* \* \*